(12) United States Patent
Av-Shalom et al.

(10) Patent No.: US 6,704,123 B1
(45) Date of Patent: Mar. 9, 2004

(54) METHOD FOR APPLYING TONAL CORRECTION TO A BINARY HALFTONE IMAGE

(75) Inventors: Amit Av-Shalom, Vancouver (CA); Richard Roman Bielak, Port Coquitlam (CA)

(73) Assignee: Creo Inc., Burnaby (CA)

( * ) Notice: Subject to any disclaimer, the term of this patent is extended or adjusted under 35 U.S.C. 154(b) by 0 days.

(21) Appl. No.: 09/466,379

(22) Filed: Dec. 17, 1999

(51) Int. Cl.$^7$ ............................................. G06R 15/00
(52) U.S. Cl. ..................... 358/2.99; 358/3.15
(58) Field of Search ................. 358/3.06, 2.1, 358/2.99, 3.15, 3.14, 3.27, 1.9

(56) References Cited

U.S. PATENT DOCUMENTS

| | | | |
|---|---|---|---|
| 4,308,326 A | * | 12/1981 | Wirth .............................. 430/6 |
| 5,566,003 A | * | 10/1996 | Hara .......................... 358/448 |
| 5,635,967 A | * | 6/1997 | Klassen ........................ 347/43 |
| 5,644,366 A | * | 7/1997 | Ushida ........................ 358/462 |
| 5,646,741 A | * | 7/1997 | Horiuchi ..................... 358/298 |
| 5,978,511 A | * | 11/1999 | Horiuchi et al. ............ 382/241 |

* cited by examiner

*Primary Examiner*—Jerome Grant, II
(74) *Attorney, Agent, or Firm*—Oyen Wiggs Green & Mutala

(57) ABSTRACT

A method and computer-readable medium for applying tonal correction to a binary halftone image formatted in a bit-mapped manner. The binary halftone image is descreened to obtain an individual tonal value for a plurality of pixels representing the binary halftone image. The individual tonal value is compared to a calibrated tonal value to determine a tonal change for each pixel. Based on the tonal change for each pixel, a probability of change is determined for each pixel in a set of pixels out of the plurality of pixels. The probability of change is used to determine which edge pixels undergo a state change (i.e., on to off) to effectuate a desired tonal adjustment of the binary halftone image. Error diffusion may be applied to further distribute the state changes of the edge.

25 Claims, 11 Drawing Sheets

METHOD FOR APPLYING TONAL CORRECTION TO A BINARY HALFTONE IMAGE

FIELD OF THE INVENTION

The present invention relates generally to image reproduction and, more specifically, to a method for applying tonal correction to a binary halftone image.

BACKGROUND OF THE INVENTION

In order to reproduce a realistic image of a scene, the reproduced image must have a believable tonal representation of the original scene. Tonal representation refers to the relative values of tone within an image (hereinafter referred to as "relative tonal values"), which help provide important information about the image, such as surface characteristics. Typically, these relative tonal values are measured at fixed spatial coordinates on a rectangular grid where each sample point is referred to as a picture element, commonly known as a pixel.

Image-reproduction systems fall into two categories: (1) systems capable of rendering continuous tone (contone systems); and (2) systems with limited tone reproduction capacity (binary systems). In contone systems, pixels can take on a wide range of tonal values. Examples of contone systems include photography and television. In contrast, pixels in binary systems can only take on one of two tonal values. These values correspond to either an "on" or an "off" state. For example, in printing devices, such as offset or flexo presses, each pixel on a printed medium can either be covered ("on") or not covered ("off") by ink. For color printing, each pixel can either be "on" or "off" for each layer of a different color ink. Such layers are commonly referred to as color separations.

Since images to be reproduced by such binary systems are often initially contone images, these binary systems use a process called "halftoning" to achieve a wider range of tonal values (gray or color levels). Thus, the binary systems achieve a believable tonal representation of the original contone images. In general, halftoning is a process for approximating continuous-tone values using a pattern of pixels. Various halftone processes are well known in the art, such as error diffusion and dithering.

Basically, the halftoning process defines a region of pixels as a halftone cell, sometimes referred to simply as a "cell". The halftone cell contains a specific, repeatable pattern referred to as a "halftone pattern" that is typically beyond the resolution of the eye. For each "halftone pattern," the pixels are numbered in a specific order. The specific order determines the sequence for turning pixels "on" in the halftone cell. The number of pixels in the cell determines its tonal range. For example, a halftone cell with a two-by-two matrix of pixels may represent five different intensities of a color (also commonly referred to as shades or tonal values): white; black; and three intermediate levels of gray. The color white is represented by all four pixels in a white or "off" state. Conversely, black is represented by all four pixels in a black or "on" state. The intermediate levels of gray are represented by one, two or three pixels in the "on" state and the remaining pixels in the "off" state.

A tonal value for a specific location "seen" by the eye (hereinafter referred to as a "visible tone") is approximated using the halftone pattern in the neighborhood of the location, i.e. approximately the percentage of "on" pixels in the neighborhood of the specific location. The visible tonal value is only approximately, and not exactly proportional to the percentage of "on" pixels, due to a variety of reasons related to the printing environment. Some of such reasons are that printing devices do not produce ink spots with exactly the same size and shape as a pixel; light reflection and diffusion in the selected paper affect the tone; hue and density of the ink may differ between printing devices. Therefore, in order to achieve the desired tonal representation for a specific printing device, a calibration curve is applied before printing. The calibration curve is specific to each individual printing system and is derived experimentally using methods well known in the art. The calibration curve describes the required percentage of "on" halftone pixels for generating each tonal value for a specific printing environment. Some calibration curves describe this relationship for each color separation. However, other calibration curves describe the required number of "on" halftone pixels for each color separation based on the overall desired tonal value taking into consideration the interaction between the color separations. The process of applying a specific calibration curve to a halftone image is referred to as "tonal calibration" or "tonal correction". A halftone image that has a percentage of "on" pixels proportional to the original image is referred to as an "uncalibrated" image because the desired tonal value of the original image is achieved without modifying the tonal values of the pixels.

Preferably, when a contone image is received, a binary image reproduction system performs tonal correction utilizing a calibration curve associated with the target printer before performing or completing the halftone process. However, in certain situations, the target printing device may acquire a digital halftone image or a halftone film that is subsequently converted to a digital halftone image by a copydot scanner. In both these situations, because halftoning is completed before the target printing device and other printing conditions are known, the halftoning is performed either without tonal calibration or using an incorrect calibration curve. This results in artifacts in the printed image.

One prior attempt for applying tonal correction to a binary halftone image involves a three-step process: (1) descreening the original halftone image to create a contone image; (2) adjusting the tone of the contone image; and (3) screening the contone image to produce a new binary halftone image with the adjusted tone.

The descreening step applies a low pass filter to the binary original halftone image to produce the contone image. The low pass filter removes the original halftone structure from the original halftone image. A disadvantage of this step is that a filter strong enough to remove the halftone structure also removes some image detail. The adjusting step replaces each pixel in the contone image with a pixel having a corrected tone. The pixels having the corrected tone may be derived from an arbitrary function of the tone of the original pixel or may be derived from a more complex function of the tone taken from multiple color separations. The final screening step creates the new binary halftone image from the contone image. This step takes as input the contone image, screen frequency, screen angle, and dot shape. The screen frequency and angle may be extracted from the original binary halftone image with good success using Fourier techniques. A disadvantage of the step is that the dot shape can not usually be determined very reliably and choosing the wrong dot shape may cause image artifacts, such as tone jumps.

Another prior attempt for applying tonal correction to a binary halftone image involves using a low-pass filter that retains the halftone structure. Thus, the low-pass filter only softens the edges of the features in the image. Then, after descreening with the low-pass filter, a threshold is applied to the contone image to approximately reconstruct the original binary halftone image. If a point in the image is whiter than the threshold, the point is set to pure white. If a point in the image is blacker than the threshold, the point is set to pure black. In order to reconstruct the binary halftone image accurately in the highlights and shadows, the threshold must change as a function of the tonal value at each point. Adjusting the threshold away from the nominal position can be used to perform tonal correction on the image. This approach has two disadvantages. First, the filtering step removes a small amount of spot shape detail from the original image. Second, because the tonal change does not account for dot shape and edge roughness, errors are introduced during the tonal correction.

Accordingly, there is a need in the art for a method of applying tonal correction to a digital halftone image without producing any tonal artifacts.

SUMMARY OF THE INVENTION

In accordance with this invention, a system, method and a computer-readable medium for applying tonal correction to a binary halftone image are provided. The binary halftone image is formatted in a bit-mapped manner and is either uncalibrated or calibrated with a known calibration curve. A plurality of edge pixels are determined from the binary halftone image such that each edge pixel has a state that is different than the state of at least one neighboring pixel. A subset of the edge pixels are selected that will have their state modified to effectuate a desired tonal adjustment of the binary halftone image. A tonal change is determined for each edge pixel by descreening the image to determine a tonal value at each point in the image and applying a calibration curve to each tonal value. Descreening the image applies a two-dimensional low pass filter that removes the halftone structure from the binary halftone image.

In accordance with further aspects of this invention, in one embodiment, selecting the subset of the edge pixels that will have their state modified involves assigning a probability of change to each edge pixel. The probability of change assigned to each edge pixel is a ratio of 1) a number of pixels which have to change states in the neighborhood of the edge pixel to effectuate the desired tonal adjustment over 2) the number of edge pixels in the same neighborhood.

In another embodiment, error diffusion is used in combination with the probability of change to select the subset of edge pixels that are modified to effectuate the desired tonal adjustment. For each pixel in the image, if the pixel is an edge pixel and the probability of change is greater than 0.5 the state of the pixel is changed. Otherwise, the state of the pixel is unchanged. Error diffusion is used to propagate the residual error to neighboring pixels, thus, modifying the probability of change for the neighboring pixels.

In an alternate embodiment, the image is divided into small blocks. The state of the edge pixels in each block are changed pseudo-randomly based on the assigned probability of change. In order to minimize noise, multiple trial solutions are created for each block and the trial that minimizes the tonal error is chosen as a best trial. Error diffusion may be employed on each block to improve the uniformity of the distribution of the modified edge pixels throughout the image.

In another embodiment, selecting the subset of edge pixels that will have their state modified involves assigning a probability of change not just to the edge pixels but to every pixel in the image. The probability of change for each pixel is then the desired tonal change determined for the respective pixel. Although every pixel has a probability of change, only the edge pixels are allowed to change states. Error diffusion is applied to ensure that the probability of change for non-edge pixels is propagated to the edge pixels.

As will be readily appreciated from the foregoing summary, the invention provides a new and improved system, method and computer-readable medium for adjusting tone in binary halftone images to create smooth images without noise and other artifacts.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is a system, method and computer readable medium for applying tonal correction to binary halftone images. To avoid unduly complicating the following discussion, the present invention is described in relation to a monochromatic, e.g., black and white, digital image-reproduction system. However, one skilled in the art and others will appreciate that the principles of the present invention are also applicable to color image-reproduction systems.

Figure 1:
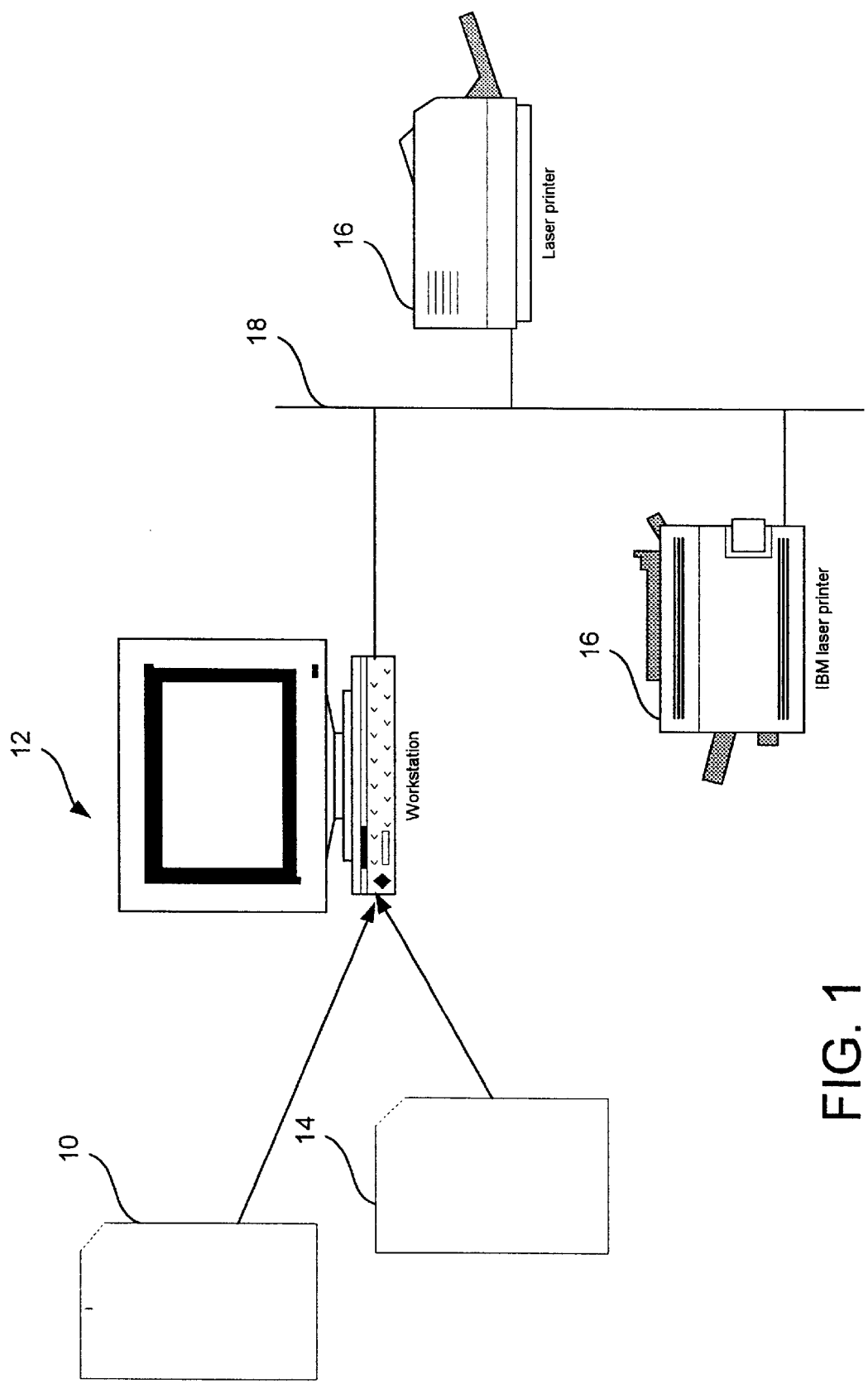
FIG. 1 is a block diagram of a suitable image-reproduction system in which the present invention is implemented.

Referring to FIG. 1, a suitable digital image-reproduction system 8 of the type in which the present invention may operate is illustrated in block diagram form. An original digital halftoned image (original image) 10 is input into a processing unit 12, such as a workstation. The original image 10 is created using methods well known in the art. The original image 10 is stored in a computer-readable file having a file format for representing bit-mapped graphical data, such as tagged image format data (TIFF), encapsulated PostScript (EPS), graphics interchange format (GIF) and others. As mentioned earlier, the original image 10 is represented by "on" pixels and "off" pixels. Typically, the "on" and "off" pixels in the original image 10 are not randomly distributed. Rather, the original image 10 will have clusters of "on" and "off" pixels. For example, in amplitude modulated (AM) screening in which a size of a dot is varied to simulate different shades of a color, the pixels are clustered into "dots" on the grid. Also, in frequency modulated (FM) screening in which the dot size is constant but the number of dots is varied to simulate different shades of color, the pixels again are clustered in "dots" on the grid when there is a high resolution. The present invention either enlarges or decreases these clusters of "dots" when applying the tonal calibration instead of generating new isolated pixels or clusters.

The processing unit 12 receives and processes the original image 10 according to the present invention by using a supplied calibration curve 14 for one of several target printers 16. The processing unit 12 includes an input/output port for receiving the transmitted original image 10, a memory for storing data and instructions and a processor for executing the instructions. The following discussion describes the processing unit 12 as a workstation, but one skilled in the art and others will appreciate that the processing unit may be located within the target printer 16, a scanner, or some other device. Furthermore, the target printer 16 may be an attached printer, a remote printer, or a networked printer. The physical connections between the target printer 16 and the workstation 12 and the method of transmitting bit-mapped files therebetween are well known in the art and will not be described in further detail.

Figure 2:
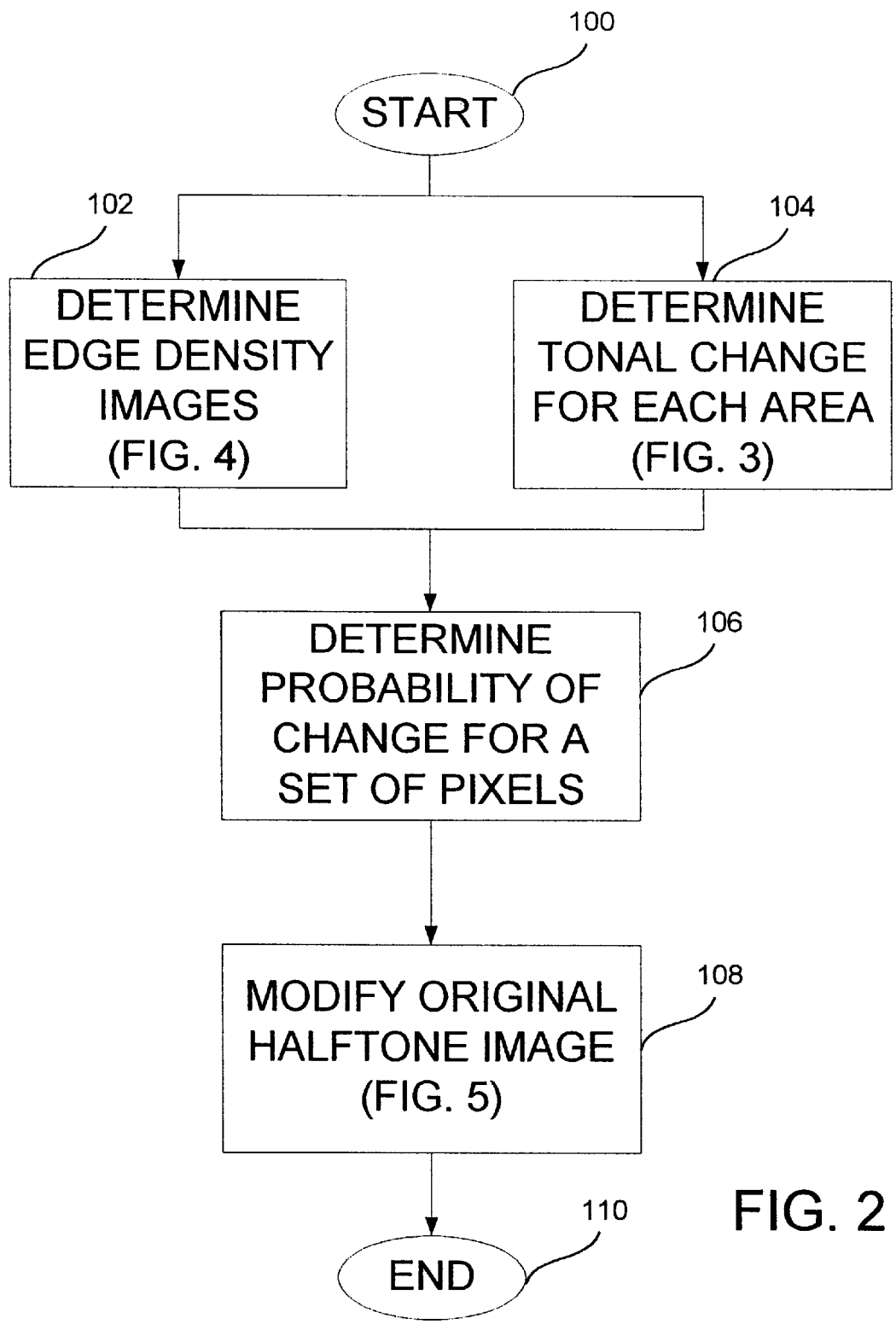
FIG. 2 is a flow diagram illustrating an overview of the process of the present invention for applying tonal correction to a binary halftone image.

FIG. 2 illustrates an overview of the process for applying tonal correction according to the present invention. Each step of the process described generally in reference to FIG. 2 will be described more fully below. In general, at a start block 100, a halftoned digital image (hereinafter referred to as the original image 10 as shown in FIG. 1) is available for processing in a workstation 12 shown in FIG. 1. The processing proceeds through two independent paths: one path which determines edge density images from the original image, depicted at block 102, and the other path which determines a tonal change for each pixel in a unit area of the original image 10, depicted at block 104.

Briefly, an edge density image is an image depicting a number of edge pixels per unit area. This disclosure uses the term edge pixel to refer to pixels having at least one side bordering a neighboring pixel that is in a state different than itself. Because the present invention modifies only the edge pixels, the clusters will inflate or shrink without generating new isolated pixels or clusters. A tonal change for each pixel is based on an average tonal value calculated from the original image and a calibrated tone obtained from a calibration curve. Once both the edge density images at block 102 and the tonal change at block 104 are completed, the processing proceeds to block 106 where a probability of change for each pixel is determined by comparing an associated pixel in the edge density images with the tonal change calculated for the pixel. Based on the comparison performed in block 106, the original image 10 is modified at block 108 to produce a modified halftone image and then processing completes at an end block 110. The resulting modified halftone image is a calibrated halftoned image that is calibrated for a specific target device. Thus, when the target printing device processes the modified halftone image, a resultant image is printed that depicts the original contone image without any tonal artifacts.

As one skilled in the art and others will appreciate, the intermediate images in FIG. 2 and in other figures (e.g. "edge density images" in block 102) may not actually exist as complete images. For this embodiment, the processing operates on small fragments of the original image-such as slices containing a few lines-one at a time in a pipeline manner. However, for ease of explanation, the following discussion describes the process of the present invention in which the processing operates on the entire original image 10.

Figure 3:
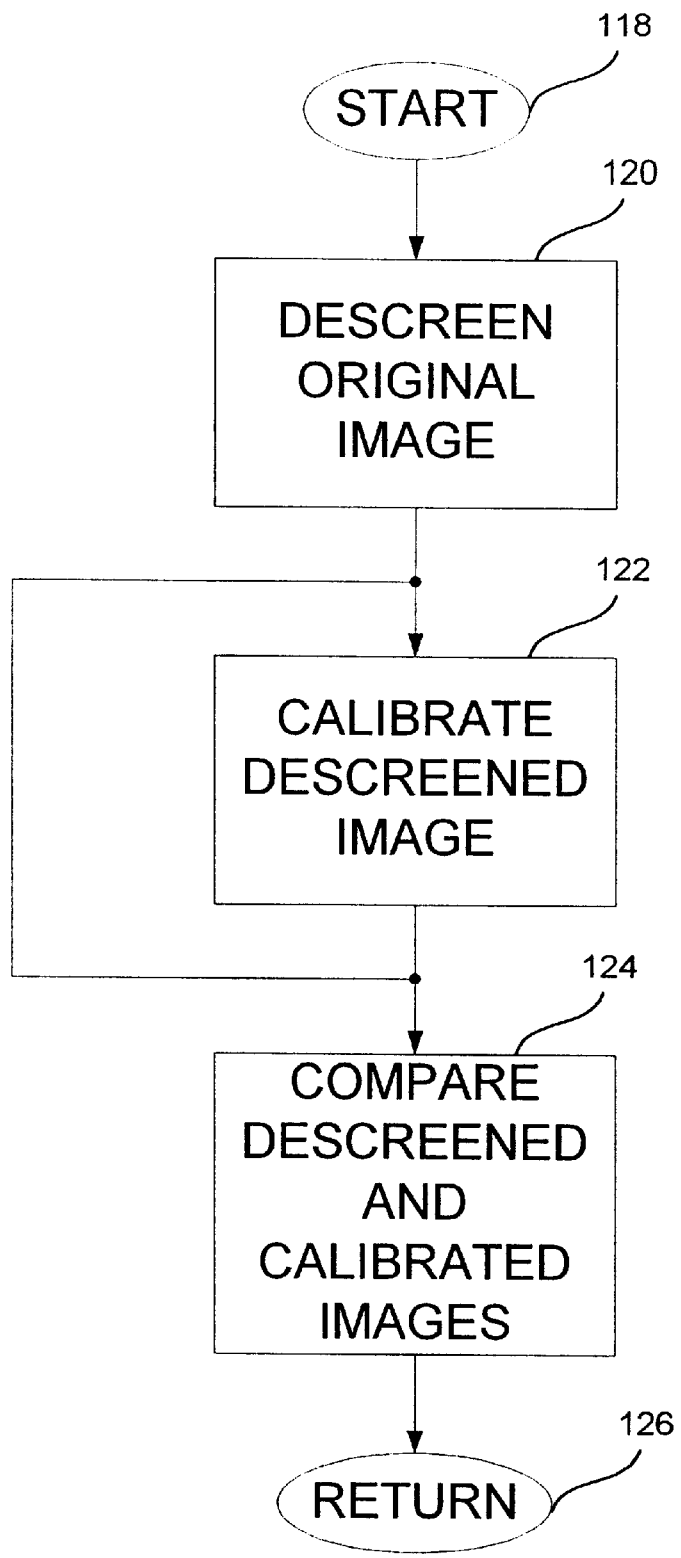
FIG. 3 is a flow diagram illustrating a process of determining a tonal change for use in the process shown in FIG. 2.

Referring to FIG. 3, the process for determining the tonal change for each pixel representing an area of the original image suitable for use in block 104 of FIG. 2 is described in detail. At a start block 118, the original image 10 is available and is input to a descreening, or unscreening, process at block 120. In general, descreening refers to obtaining a local average of a density of "on" pixels in the neighborhood of each individual pixel in the original image. Thus, descreening provides the visible tonal value of the original image 10. The outcome of the descreening is a continuous tone image, represented by values that have more than just two states (i.e. "on" or "off"). In one embodiment, contone values are 8-bit values capable of representing 256 gray states or tones.

If the halftoning process, which originally generated the original halftone image 10, had been uncalibrated, then the outcome of the descreening is (approximately) the contone image that was originally halftoned. In this case, the descreened original image represents the desired tone for the original halftone image. In addition, if the halftone processing uses a known calibration curve, then the original contone image with the desired tone can be obtained from the descreened original image after undoing the calibration.

Descreening, or local averaging, is done by applying a low-pass filter to the original image 10. Many different filters may be used. In the current embodiment, a truncated Gaussian filter is used, given by the following function:

$$\begin{aligned} -e^{-(x^2+y^2)/2s^2} &\quad \text{for } x^2 + y^2 < (3s)^2 \\ 0 &\quad \text{for } x^2 + y^2 > (3s)^2 \end{aligned} \quad (1)$$

where x is a horizontal distance from a point in the image; y is a vertical distance from the point; and s is a parameter, determining the spread, or width, of the filter (the size of the area being averaged). The value of the parameter s determines the descreening quality. If the s value is too small, the filter will not completely remove the halftone pattern. If the s value is too large, the filter will cause a blurred descreened image. In order to obtain optimal quality, the value of the parameter s should depend on how fine the halftone pattern is. However, for the present invention, the tonal correction does not require a high quality descreening. Rather, the present invention recognizes that the tonal calibration curves are usually slowly varying functions of the tone, and that small inaccuracies in tone measurement (descreening) has only negligible effect on the required tonal change. Therefore, any value of the parameter "s" within a wide range (approximately between 0.5 to 1.5 times the screen periodicity) will usually yield sufficiently good results in accordance with the present invention. This allows a single value of the parameter "s" to be used for most halftone screens encountered. Thus, a measurement of the screen periodicity (or other parameters of the halftone pattern) is not required.

The present invention also recognizes that by averaging the neighboring pixels in the original image the tonal differences between short-distances become insignificant. Therefore, in one embodiment, the present invention generates the descreened original image having a lower resolution than the resolution of the original image 10. In one embodiment, the resolution is decreased by a factor of eight. For example, if the original image is 2400 dots per square inch (dpi), the descreened original image is 300 dpi. The lower resolution allows the present invention to generate a modified digital halftoned image much more efficiently because there are fewer pixels to process. In the example described above, one pixel in the descreened original image corresponds to a square 8×8 pixel area of the original image 10.

In one embodiment, each pixel in the descreened original image has an associated 8-bit tonal value that provides up to 256 tonal values. The descreened original image is calibrated at block 122 using a calibration curve 12 for a target printer 16 (shown in FIG. 1). As mentioned earlier, each printing environment has an associated calibration curve that has been calculated experimentally. This curve specifies the density of "on" pixels (i.e. number of "on" pixels per unit area) required to obtain a desired tone. In block 122, the curve is applied to the descreened original image. The calibration curve may be a function of the desired tone. Therefore, when applying the calibration curve, a value of the function is read to obtain the desired tone at each point in the image.

Typically, each color separation may be calibrated separately. However, as one skilled in the art will appreciate, some calibration curves are functions not of an individual separation's tone, but of the tone values of all the separations. For these calibration curves, the input to block 122 will include the descreened images of all the separations. In this case, simultaneous access to all the color separations is needed at block 122. The processing performed in the other blocks may be completed independently with each color separation. Ultimately, the output of block 122 is a calibrated image that is specific to the target printer 16.

The descreened original image and the calibrated image are compared at block 124. The pixels from both the descreened original image (output of block 120) and the calibrated descreened image (output of block 122) are typically represented by the same number of bits, such as 8 bits. The comparison performed at block 124 subtracts the tonal value for each pixel in the descreened original image from the tonal value for the corresponding pixel in the calibrated descreened image. The difference determines the density, or number per unit area, of pixels that need to be preferably changed from "off" to "on" (or from "on" to "off", if the difference is negative). One skilled in the art will appreciate that the calibration performed at block 122 may be performed simultaneously with the comparison at block 124. If done in this manner, the calibrated image is not actually created. Rather, the data obtained from the calibration curve for the target printer is compared directly with the descreened original image for each pixel. In either embodiment, the processing then proceeds to return block 126 and back to FIG. 2. Before describing the further processing involving the tonal change determined at block 104 of FIG. 2, the second independent path, block 102, is described.

Figure 4:
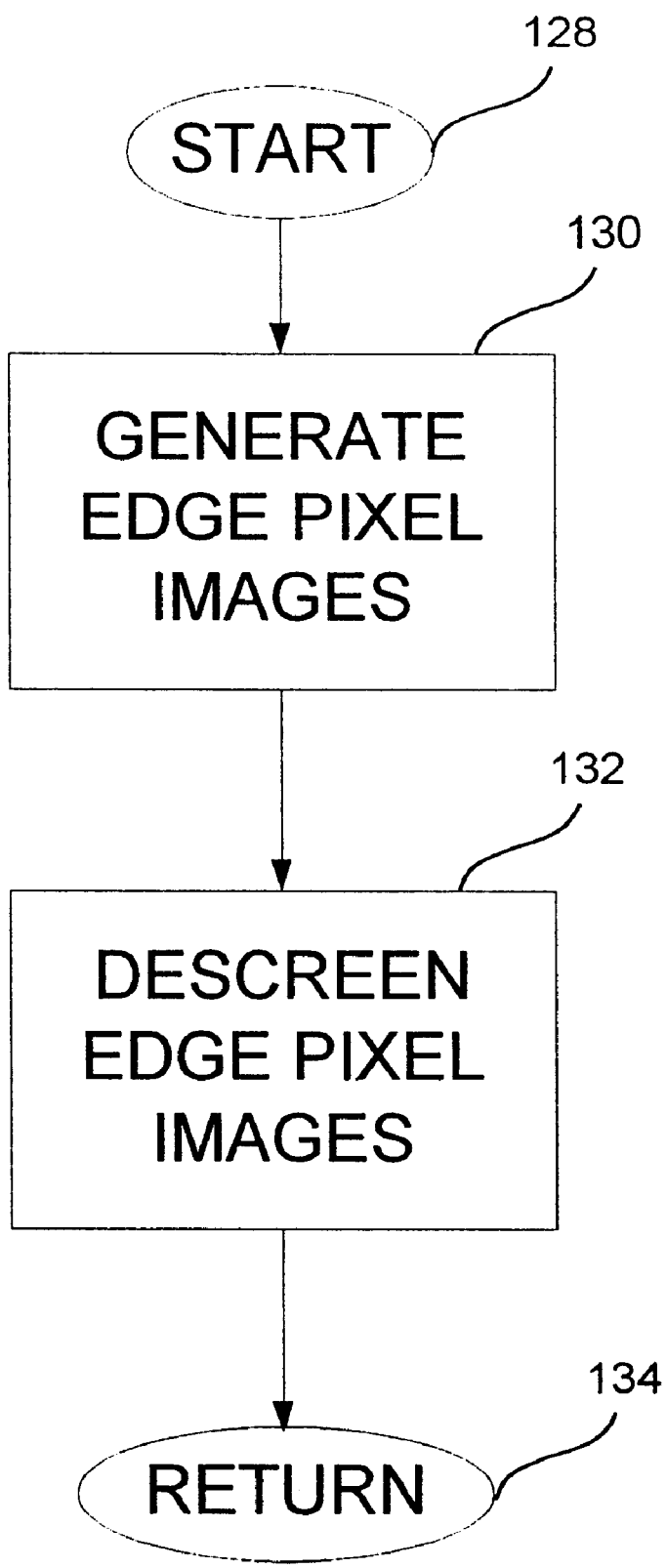
FIG. 4 is a flow diagram illustrating a process of determining edge density images suitable for use in the process shown in FIG. 2.

Referring to FIG. 4, a flow diagram of the process for determining edge density images from the original image, suitable for use in block 102 of FIG. 2, is described in detail. At a start block 128, the original image 10 is available for generating edge pixel images at block 130. As the name implies, the edge pixel images are generated using information in the original image regarding the pixels that have at least one side bordering a pixel that is in a state different than itself. Such pixels are referred to as edge pixels.

Figure 10A:
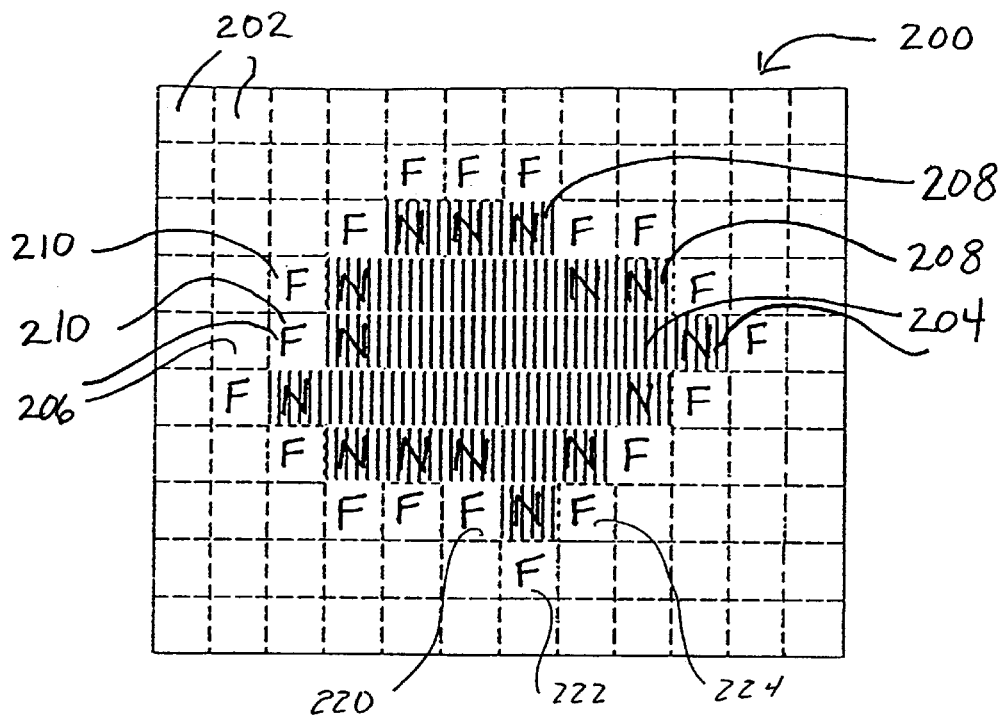
FIGS. 10–12 are pixel diagrams of exemplary halftone cells depicting various edge pixels and changed pixels in accordance with the present invention.

As an example, FIG. 10A is a pixel graph illustrating an edge pixel image 200 of a portion of the original image 10. The pixel graph is a 12×10 pixel array of a portion of the original image 10. Each grid square 202 of the pixel graph represents a pixel. The grid squares 202 with vertical hatching represent pixels that are in an "on" state (hereinafter referred to as "on" pixels 204) and the grid squares 202 without any hatching represent pixels that are in an "off" state (hereinafter referred to as "off" pixels 206). Certain "on" pixels 204 are further denoted with an "N" to symbolize that these "on" pixels 204 are also edge pixels (hereinafter referred to as "on" edge pixels 208). As described above, each "on" edge pixel 208 has at least one side bordering an "off" pixel 206. These "on" edge pixels 208 are candidates for change if the tonal change, which is determined at block 104 for the particular edge pixel, is a negative value (i.e., "on" to "off"). Likewise, certain "off" pixels 206 are further denoted with an "F" to symbolize that these "off" pixels 206 are also edge pixels (hereinafter referred to as "off" edge pixels 210). These "off" edge pixels 210 are candidates for change if the tonal change is a positive value (i.e., "off" to "on"). Again, each "off" edge pixel 210 has at least one side bordering an "on" pixel 204.

Figure 10B:
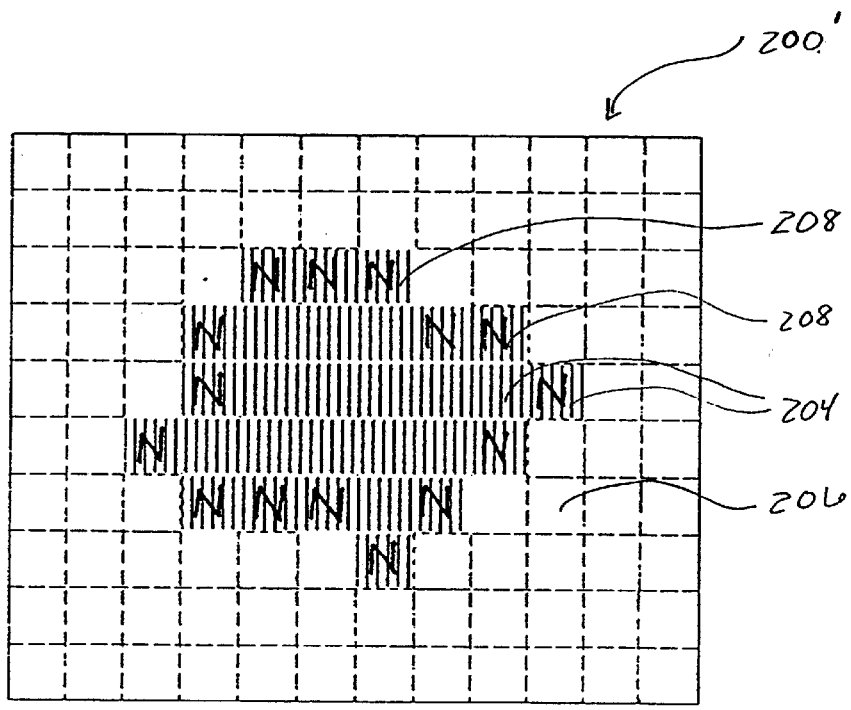
Figure 10C:
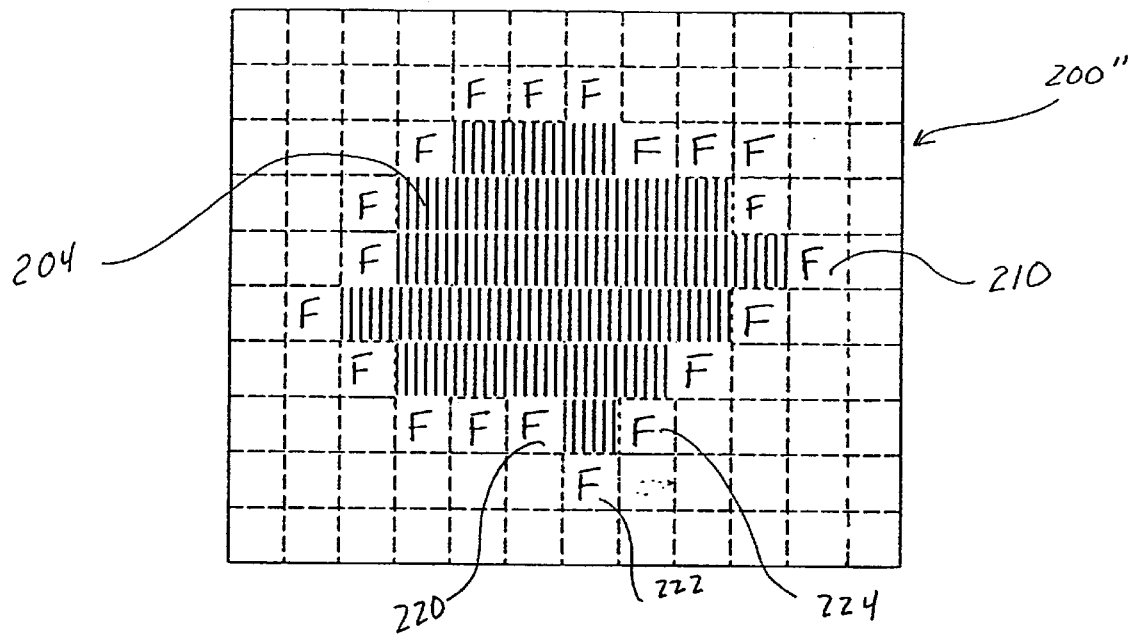

Typically, as is shown in FIG. 10A, the number of "on" edge pixels 208 (i.e. 15) is different than the number of "off" edge pixels 210 (i.e. 19). Therefore, two edge images are generated to be used in further processing. Referring to FIGS. 10B and 10C, an inner edge image 200' displays only the "on" edge pixels 208 and an outer edge image 200" displays only the "off" edge pixels 210, respectively.

Referring back to FIG. 4, both the inner edge image 200' and the outer edge image 200" are descreened at block 132. The descreening process of block 132 uses the same filter as described above for the descreening process in block 120 of FIG. 3. In addition, each edge image 200' and 200" is descreened independently, resulting in two output images: a descreened inner image and a descreened outer image. In one embodiment, the descreened inner and outer images have the same resolution as the descreened image generated at block 120 of FIG. 3 described above. The processing then proceeds to return block 134 and back to block 106 of FIG. 2.

At block 106, a probability of change for a set of pixels is determined by comparing the tonal value for each pixel from the descreened inner and outer images (determined at block 132 of FIG. 4) to the tonal change determined in block 104 for the corresponding pixel. As described above, the tonal change may represent a positive change or a negative change. The positive change occurs when the difference between the calibrated tonal value of the pixel from the calibrated image and the tonal value of the corresponding pixel of the descreened original image is a positive number, thus indicating that a number of "off" edge pixels 210 should change from "off" to "on". Determining which of the edge pixels should change states is achieved by calculating the probability of change for each pixel. In one embodiment, the probability of change for each edge pixel in a given area is calculated by taking the ratio of the density of pixels required to change in that area (i.e. the tonal change for the pixel determined at block 104) to the density of pixels available for change as determined by the edge density image corresponding to the sign of the tonal change.

The following is an example describing the calculation for the probability of change for a pixel. The example assumes a negative value for the tonal change indicating that some of the "on" edge pixels 208 shown in FIG. 10B should change states and become "off" pixels 206. The probability that a specific "on" edge pixel 208 will change to an "off" pixel 206 is determined by taking the absolute value of the ratio of the tonal change for the specific "on" edge pixel to the number of "on" edge pixels 208. For example, assuming a tonal change of negative ten per unit area, and using the number of "on" edge pixels of the descreened inner edge image 200' shown in FIG. 10B (15, assuming the unit area is the area included in the figure), the probability of change for this specific "on" edge pixel is |–10/15| (approximately 0.67).

Conversely, if the tonal change is positive, some of the "off" edge pixels 210 in the descreened outer edge image 200" shown in FIG. 10C should change states and become "on" pixels 204. The probability that a specific "off" edge pixel 210 will change to an "on" pixel 204 is determined by taking the ratio of the tonal change for the specific "off" edge pixel to the number of "off" edge pixels 210. For example, assuming a tonal change of ten pixels per unit area, and using the number of "off" edge pixels shown in FIG. 10C (19), the probability of change is 10/19 (approximately 0.53).

As mentioned above, the descreening process of block 120 in FIG. 3 and of block 132 in FIG. 4 results in descreened images with a lower resolution than the original image. In essence, this means that the pixels in the descreened images have a bigger size than the pixels of the original image 10. In the embodiment described above, each pixel in the descreened images represents an 8×8 matrix of pixels in the original image 10. The probability of change calculated at block 104 applies to all the pixels in the 8×8 matrix of pixels in the original image equally. In other words, all the edge pixels of the appropriate polarity in the 8×8 matrix have the same probability of change. Once the probability of change is calculated, the process proceeds to block 108 of FIG. 2 where the original image 10 is modified according to the calculated probability of change determined for each pixel.

In general, changing pixels based on a given probability without considering neighboring pixels using a pseudo-random process will generate some areas in the modified halftone image having too many pixels changed and other areas having too few pixels changed. This results in non-uniformity in the modified halftone image which is visually observable as graininess. In this specification, the term pseudo-random process refers to a process that approximates a true random process. The pseudo-random process includes a truly random sequence, a finite set of random decisions that are then repeated, a deterministic algorithm that generates a random-like sequence, and any combination of the stated techniques that will approximate a random process.

In one embodiment of the present invention, error diffusion is used to obtain a more uniform distribution. In general, for this embodiment, the decision whether to change a given pixel is intended to make the actual number of changes in some region as close as possible to a desired number where the desired number of changes among a collection of pixels is the sum of the changing probabilities for the collection of pixels. The difference between the desired number and the actual number of changes is calculated along some path for each pixel. The difference is referred to as "error". Therefore, when a next pixel with a probability of P is encountered along the path, the desired number of changes ("error") is increased by P. If this results in the "error" being greater than a predetermined value, the pixel will be changed to a different state. The "error" will then decrease by one and the actual number will increase by one. However, if the "error" is not greater than the predetermined value, the pixel will not be changed and neither the "error" or the actual number will change. In one embodiment, the predetermined value is 0.5 corresponding to having the pixel change if and only if the "error" is larger than 0.5. Therefore, the use of the term "probability of change" does not necessarily mean a random process, but rather means that out of a plurality of pixels, each pixel having a probability of change of P, the proportion of changed pixels should be P.

Figure 5:
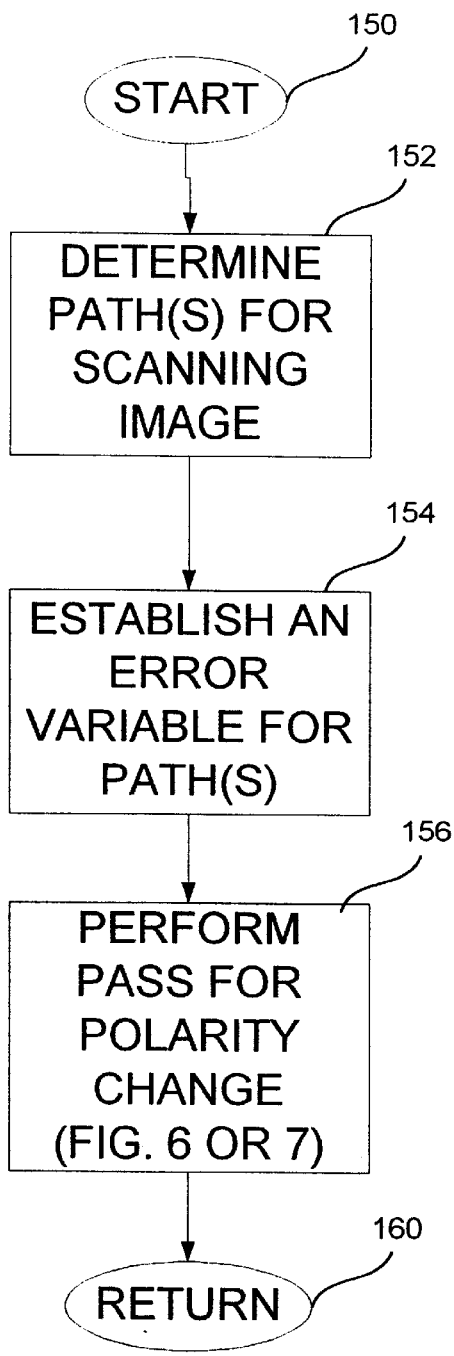
FIG. 5 is a flow diagram illustrating a process of modifying the original binary halftone image suitable for use in the process shown in FIG. 2.

FIG. 5 is a flow diagram that illustrates in detail the process of modifying the original image according to the calculated probability of change. The process begins at start block 150 where the original image 10 is available for processing and proceeds to block 152. At block 152, a determination is made to scan the original image 10 in one or more paths. There are numerous paths that may be used for scanning. However, a convenient path is defined by dividing the original image 10 into several 8-pixel-wide vertical slices, each slice is scanned in a raster-type manner: line-by-line left to right from top to bottom for each vertical slice. Then, at block 154, an "error" for each of the defined paths is defined and initialized. An error variable may be initialized to zero. In another embodiment, the error variable is initialized to a random value within some range, such as from −0.5 to 0.5. Next, at block 156, a pass is performed through each pixel in one of the 8-pixel-wide vertical slices to selectively change the polarity of the pixels to create a corresponding portion for a modified halftone image.

Figure 6:
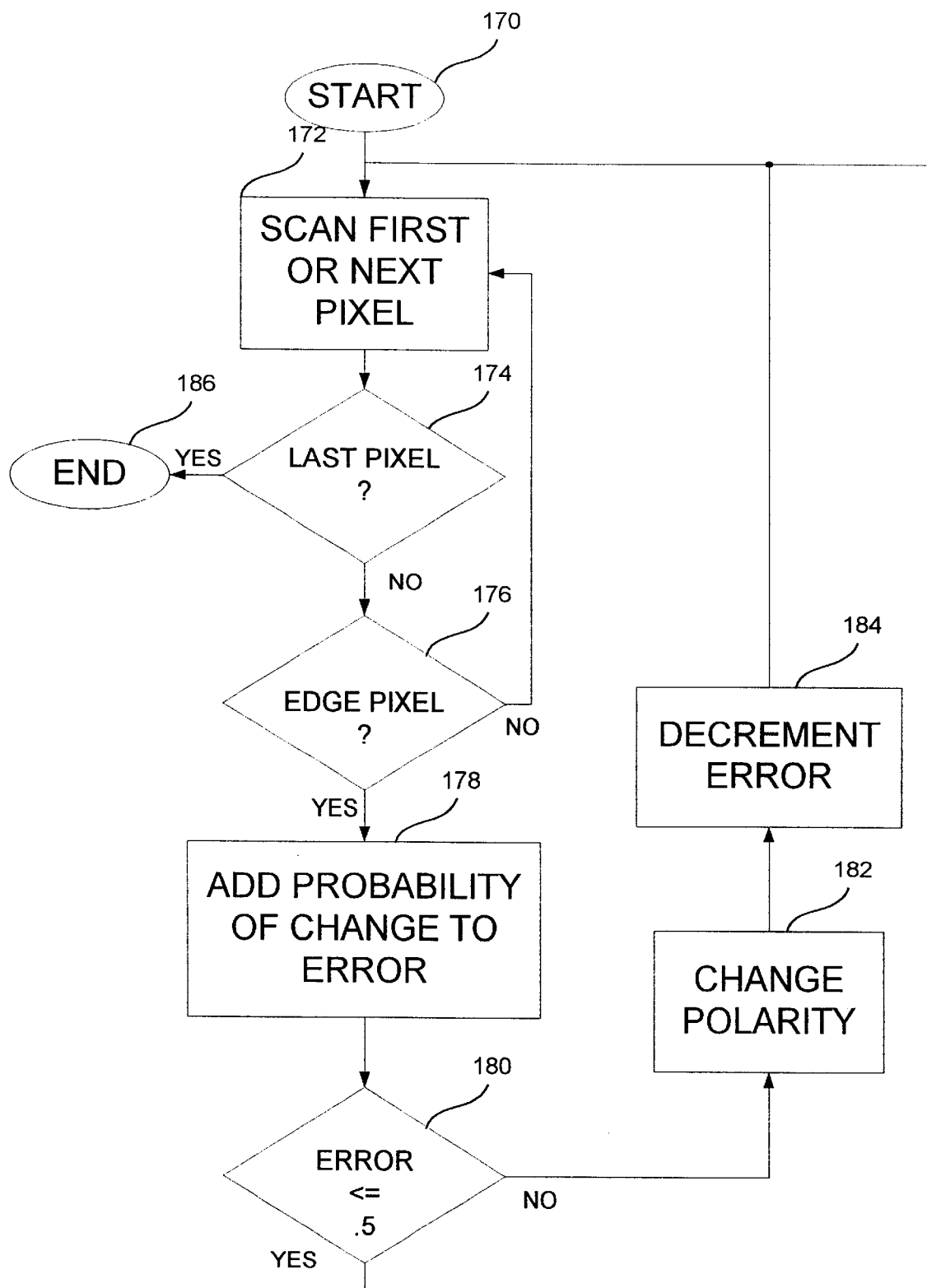
FIG. 6 is a flow diagram illustrating a process of performing a pass through the binary halftone image suitable for use in the process in FIG. 5.

FIG. 6 is a flow diagram illustrating in detail the logic for performing the pass through the original halftone image. At a start block 170, the original image 10 is available for scanning. A first pixel in one of the vertical slices is scanned at block 172. Then, a test is made at block 174 to determine whether the scanned pixel is the last pixel in the vertical slice. If so, processing proceeds to a return block 186 and returns to FIG. 5. If not, another test is made to determine whether the scanned pixel is an edge pixel. See block 176. If the scanned pixel is not an edge pixel, the probability of change for the scanned pixel is zero because, as described earlier, only the edge pixels are considered for changing states to accomplish the desired tonal change. Processing continues by looping back to block 172 where a next pixel is scanned and the process described above is repeated. If the scanned pixel is an edge pixel, the error variable is increased by the probability of change for the scanned pixel at block 178.

Using the previous example in which the probability of change for a specific "on" pixel (calculated in block 106 of FIG. 2) is 0.67., when this specific "on" pixel is encountered, the value of the error variable is increased by 0.67. If the resulting value of the error variable is less than or equal to 0.5, the polarity of the specific "on" pixel is not changed and processing loops back to block 172. If the error variable is greater than 0.5, the polarity of the specific "on" pixel is changed at block 182 and the error variable is decreased by one, at block 184. Processing then loops back to block 172 until all the pixels of the original image 10 have been scanned and the process is complete. By modifying the original image 10 according to the present invention, the "changed" pixels are distributed uniformly over the portion of the image to avoid noise and other artifacts.

Figure 11:
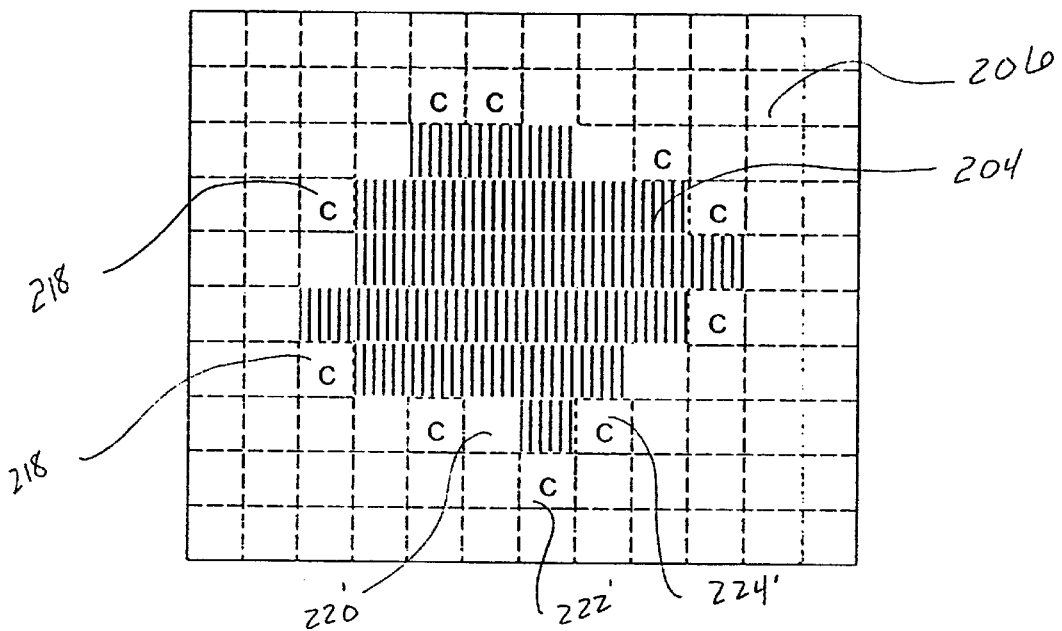

FIG. 11 is a pixel graph illustrating the outcome of the present invention on the portion of the original image 10 illustrated in FIG. 10A. FIG. 11 uses the same representations for "on" pixels 204 and "off" pixels 206 as in FIG. 10A. As shown, certain "off" pixels 206 are denoted with "C" to symbolize that these "off" pixels 206 were changed to "on" pixels 204 (hereinafter, referred to as changed pixels 218). In comparison, the modified cluster in FIG. 11 is not as smooth as the cluster in the original image illustrated in FIG. 10A. In particular, the edge between "on" pixels 204 and "off" pixels 206 is more jagged. See pixels 220, 222, and 224 in FIG. 10A in comparison with corresponding pixels 220', 222' and 224' in FIG. 11.

Figure 8:
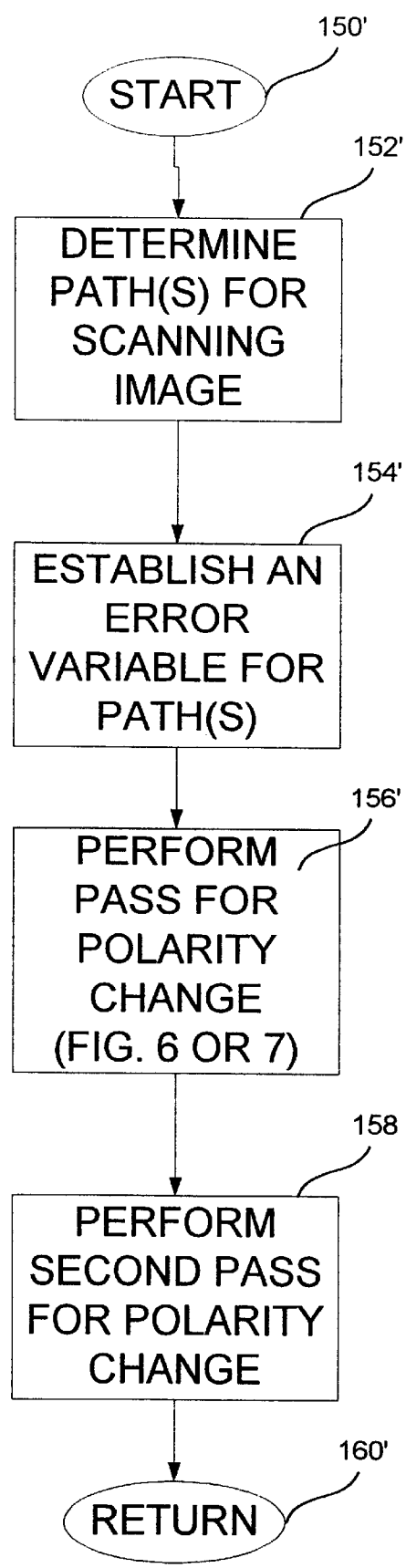
FIG. 8 is a flow diagram illustrating another embodiment for modifying the original binary halftone image suitable for use in the process shown in FIG. 2.
Figure 12:
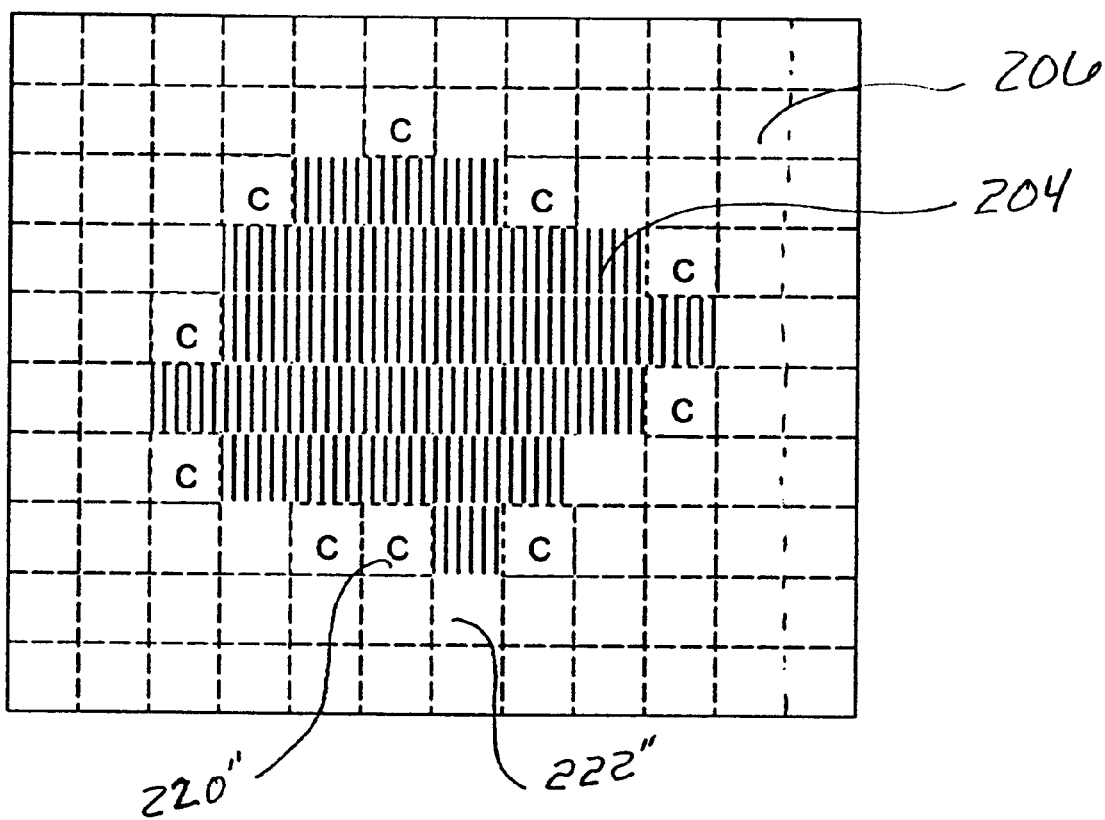

In another embodiment of the present invention, the jagged edges are smoothed, as illustrated in FIG. 12. Again, FIG. 12 uses the same notation as FIGS. 10A–C and 11 for representing "on" pixels 204, "off" pixels 206, and changed pixels 218. The cluster shown in FIG. 12, however, has shallower protrusions and, thus, a smoother edge than the modified cluster illustrated in FIG. 11. The present invention achieves the smoother edges by increasing the probability of change for pixels having two or more bordering pixels with opposite-polarity and decreasing the probability of change for pixels having only one bordering pixel with opposite-polarity. In one embodiment, this goal is achieved by performing a second pass through the changed pixels 218 of FIG. 11. The second pass changes the polarity of the changed pixels 218 from the first pass having only one opposite-polarity neighbor in the original image 10, such as pixel 222", back to their original polarity. Then, a neighboring pixel, such as pixel 220", which has more opposite-polarity neighbors changes its polarity. In essence, the polarity change is moved to another neighboring pixel. If there is not any unchanged neighbor with more than one opposite-polarity neighbors, the original polarity change is maintained. FIG. 8 is a flow diagram illustrating the above-process. As shown, a second pass at block 158 is added after performing the first pass in block 156. Like reference numbers are used on blocks providing processing as described in FIG. 5 above.

Figure 9:
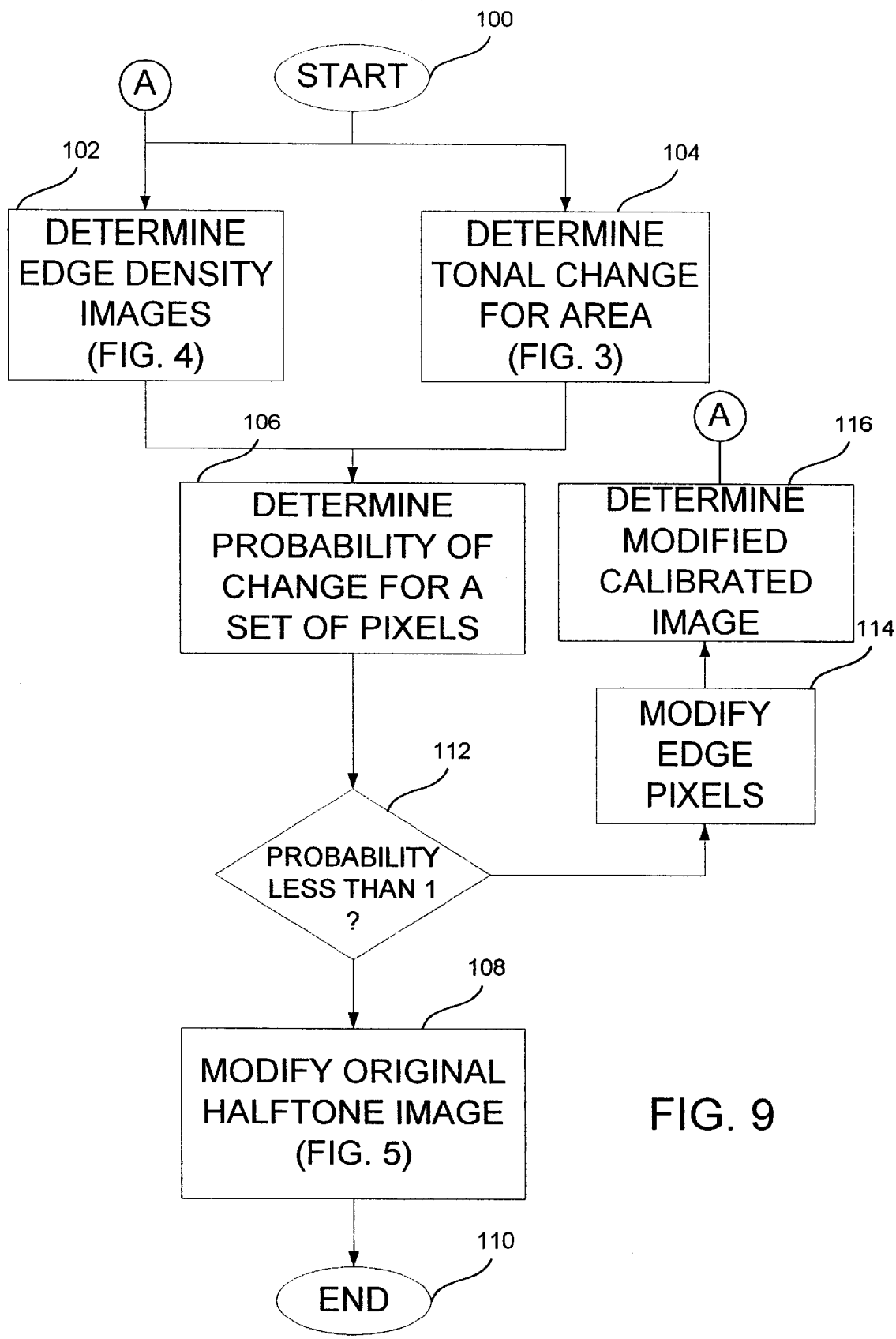
FIG. 9 is flow diagram illustrating another embodiment of the process of the present invention for applying tonal correction to a binary halftone image.

Now, referring to FIG. 9, a flow diagram of another embodiment of the process of the present invention for applying tonal correction to an original image is illustrated. Again, like reference numerals are used on blocks providing processing as described in FIG. 2 above. FIG. 9 includes an additional decision block 112 where the probability of change for each pixel determined in block 106 is compared with the value of 1. If the probability of change for the pixel is less than one, processing continues at block 108 as described above. However, if the probability of change for the pixel is larger than 1, the processing proceeds to block 114. When a pixel has a probability of change greater than one, this indicates that the tonal change is so large, that the number of pixels necessary to change polarity, exceeds the number of available edge pixels. In this case, all the edge pixels of the appropriate polarity are changed at block 114 to create a modified calibrated image. The modified calibrated image then replaces the original image and processing loops back to block 102 for a further iteration. The density of pixels changed in this iteration is subtracted from the required tonal change (outcome of block 104), and the modified calibrated image is then input to both blocks 102 and 108. The processing proceeds as described above for FIG. 2 and proceeds to end 110.

An alternate embodiment for modifying the original halftone image, block 108 of FIG. 2, involves a more random process than the deterministic process described in detail in FIG. 5. This alternate embodiment divides the image into small blocks—e.g., 16×16 pixels. For each block, several trials are held for picking the pixels to be changed. On each trial, the edge pixels are pseudo-randomly selected for changing states. The likelihood of changing states equals the assigned probability of change for the pixel. This pseudo-random process disregards neighboring pixels. The trial that results with the number of changed pixels closest to the desired number is considered the best trial. In other embodiments, other criteria for determining the best trial may be used, such as criteria involving the distribution of changed pixels within the block. Once the best trial is determined, error diffusion may be employed on a block basis to overcome residual errors still existing in each block.

Figure 7:
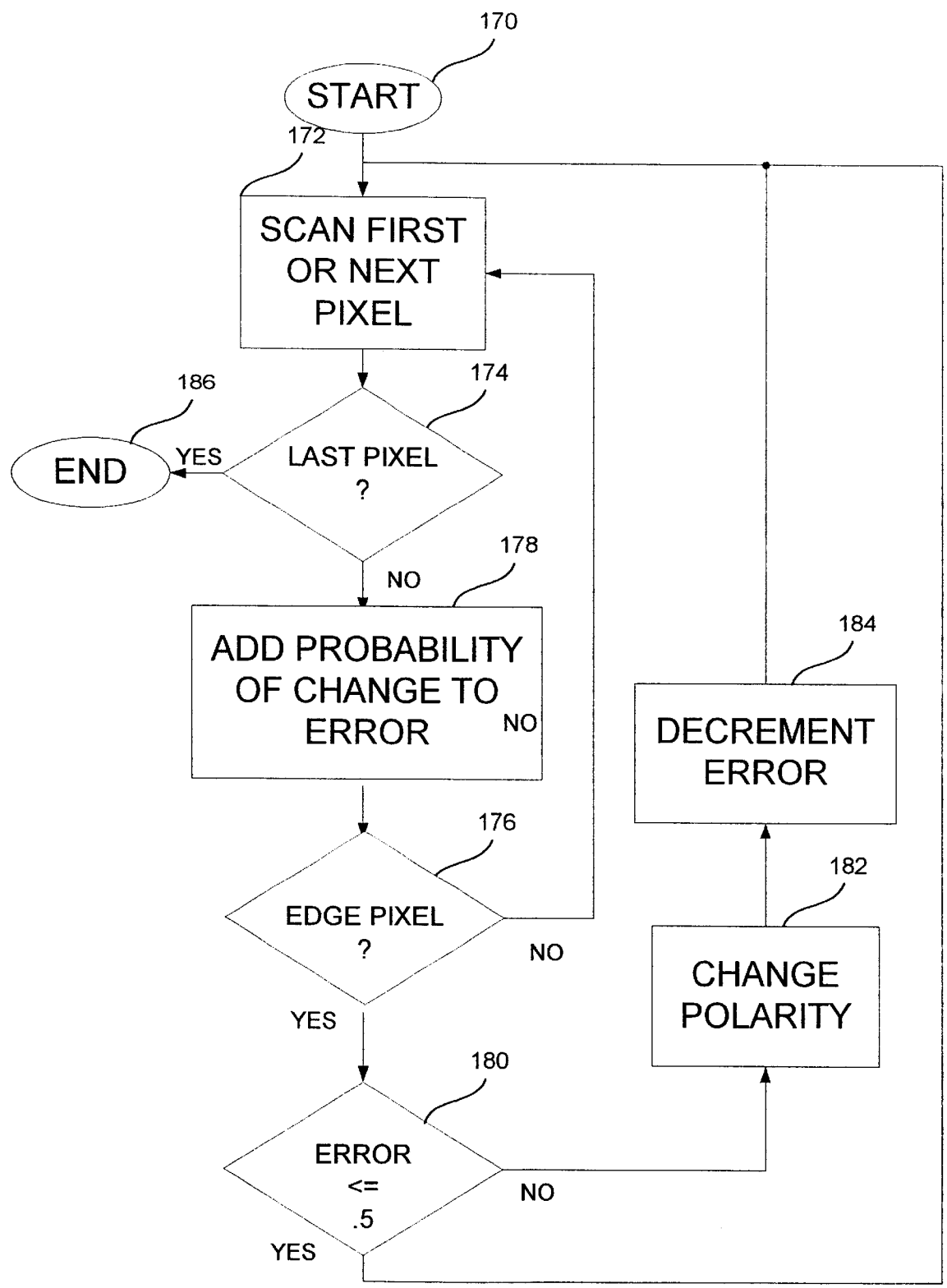
FIG. 7 is a flow diagram illustrating another embodiment of performing a pass through the binary halftone image suitable for use in the process in FIG. 5.

In another alternate embodiment, the probability of change for certain pixels in block 106 of FIG. 2 is calculated for every pixel in the image rather than just the edge pixel. For this embodiment, the probability of a change is directly related to the desired tonal change calculated by the process of FIG. 3 and block 102 of FIG. 2 is omitted. Although all pixels are assigned a probability of change, only the edge pixels are allowed to change state. Error diffusion ensures that the probability of change for non-edge pixels is propagated to the edge pixels. FIG. 7 is a flow diagram illustrating in detail the logic for performing the alternate embodiment for modifying the original halftone image. Like reference numerals are used on blocks providing processing described in FIG. 6. In general, the alternate embodiment performs the step in block 178 for all the pixels rather than for only the edge pixels. After block 178 is performed, a determination is made whether the pixel is an edge pixel. If so, the logic proceeds to decision block 180 and continues processing as described above for FIG. 6. If the pixel is not an edge pixel, processing loops back to block 172 and continues as described in FIG. 6.

As will be readily appreciated by those skilled in the art and others, a tonal correction method in accordance with the invention has a number of advantages. As a primary advantage, since halftone images can be created and transferred when the target printing device—and hence the required calibration curve—are not known, the tonal correction method of the present invention resolves the problems associated with this lack of information by providing the ability to properly correct tonal values in any supplied halftone image and to allow any target printing device to print a resultant image that depicts the original contone image.

Although the present invention is directed to tonal calibration, the same technique may be used for tonal modification of a halftone picture in which the new tone value may be a function of the old tone, and/or position within the picture.

While the preferred embodiment of the invention has been illustrated and described, it will be appreciated that various changes can be made therein without departing from the spirit and scope of the invention.

What is claimed is:

1. A method for adjusting the tone of a binary halftone image, wherein the binary halftone image is formatted in a bit-mapped manner such that a plurality of dots in the binary halftone image represent an original contone image, the method comprising:

(a) determining original tonal values represented by the binary halftone image;

(b) determining desired tonal changes for the binary halftone image as a function of the original tonal values;

(c) changing the state of a sufficient number of edge pixels in the binary halftone image to effectuate the desired tonal changes, wherein edge pixels are pixels having at least one neighboring pixel with a different state.

2. The method of claim 1, wherein determining original tonal values represented by the binary image comprises applying a low-pass filter to the binary halftone image to determine the tone represented by the binary halftone image at each pixel.

3. A method for adjusting the tone of a binary halftone image, wherein the binary halftone image is formatted in a bit-mapped manner such that a plurality of dots in the binary halftone image represent an original contone image, the method comprising:

(a) determining original tonal values represented by the binary halftone image;

(b) determining desired tonal changes for the binary halftone image as a function of the original tonal values;

(c) changing the state of a sufficient number of edge pixels in the binary halftone image to effectuate the desired tonal changes, wherein edge pixels are pixels having at least one neighboring pixel with a different state;

wherein determining original tonal values represented by the binary image comprises applying a low-pass filter to the binary halftone image to determine the tone represented by the binary halftone image at each pixel; and wherein applying a low-pass filter to the binary halftone image comprises generating an original tonal value corresponding to each pixel in the binary halftone image by local averaging the binary halftone image in proximity to each pixel.

4. The method of claim 3, wherein local averaging the binary halftone image comprises determining a density of "ON" pixels in a proximity of each pixel in the binary halftone Image.

5. A method for adjusting the tone of a binary halftone image, wherein the binary halftone image is formatted in a bit-mapped manner such that a plurality of dots in the binary halftone image represent an original contone image, the method comprising:

(a) determining original tonal values represented by the binary halftone image;

(b) determining desired tonal changes for the binary halftone image as a function of the original tonal values;

(c) changing the state of a sufficient number of edge pixels in the binary halftone image to effectuate the desired tonal changes, wherein edge pixels are pixels having at least one neighboring pixel with a different state;

wherein determining the original tonal values represented by the binary halftone image further comprises:

if the binary halftone image was previously calibrated with known calibration data:

decalibrating the binary halftone image; and using the decalibrated binary halftone image in determining the original tonal values represented by the binary halftone image.

6. A method for adjusting the tone of a binary halftone image, wherein the binary halftone image is formatted in a bit-mapped manner such that a plurality of dots in the binary halftone image represent an original contone image, the method comprising:

(a) determining original tonal values represented by the binary halftone image;

(b) determining desired tonal changes for the binary halftone image as a function of the original tonal values;

(c) changing the state of a sufficient number of edge pixels in the binary halftone image to effectuate the desired tonal changes, wherein edge pixels are pixels having at least one neighboring pixel with a different state;

wherein determining the desired tonal changes for the binary halftone image comprises applying calibration data for a target output device to the original tonal values of the binary halftone image.

7. The method of claim 6, wherein applying calibration data to the original tonal values comprises determining calibrated tonal values corresponding to the original tonal values and comparing the calibrated tonal values and original tonal values by determining the difference between each calibrated tonal value and the corresponding original tonal value.

8. A method for adjusting the tone of a binary halftone image, wherein the binary halftone image is formatted in a bit-mapped manner such that a plurality of dots in the binary halftone image represent an original contone image, the method comprising:

(a) determining original tonal values represented by the binary halftone image;

(b) determining desired tonal changes for the binary halftone image as a function of the original tonal values;

(c) changing the state of a sufficient number of edge pixels in the binary halftone image to effectuate the desired tonal changes, wherein edge pixels are pixels having at least one neighboring pixel with a different state;

wherein changing the state of a sufficient number of edge pixels to effectuate the desired tonal changes comprises:

determining a probability of change for each edge pixel according to a corresponding tonal change; and changing the status of a number of edge pixels according to the corresponding probability of change for each edge pixel.

9. The method of claim 8, wherein determining the probability of change for each edge pixel comprises calculating the ratio of the number of surrounding edge pixels which have to change state to effectuate the desired tonal change to the number of edge pixels in the area.

10. The method of claim 9, wherein the number of edge pixels in the area equals the number of edge pixels with an "ON" state if the desired tonal adjustment is indicative of a decrease in pixels with an "ON" state; and the number of edge pixels in the area equals the number of edge pixels with an "OFF" state if the desired tonal adjustment is indicative of an increase in pixels with an "ON" state.

11. The method of claim 8, wherein changing the state of a number of edge pixels according to the corresponding probability of change for each edge pixel comprises:

(a) determining a plurality of paths for scanning the binary halftone image;

(b) for each path, defining an error variable that monitors the difference between the number of edge pixels which should change state in the surrounding area and the number of edge pixels actually changed in the surrounding area; and (c) for each pixel in each path, determining whether the pixel is an edge pixel, and if the pixel is an edge pixel:

(i) adjusting the error variable by adding the probability of change determined for the edge pixel; and
(ii) if the error variable meets or exceeds a predetermined criteria, changing the state of the edge pixel and reducing the error variable by one.

12. The method of claim 8, wherein changing the state of a number of edge pixels according to the corresponding probability of change for each edge pixel comprises:
    (a) dividing the binary halftone image into small squares of N×N pixels; and
    (b) for each square, generating a plurality of trial images, wherein each trial image is generated by:
        (i) pseudo-randomly selecting edge pixels for changing state according to the probability of change of the edge pixels; and
        (ii) selecting a best trial image out of the plurality of trial images based on criteria according to the number of pixels changed in the square and the distribution of those pixels.

13. The method of claim 12, wherein the best trial image is improved by:
    (a) defining an error variable that monitors the difference between the number of pixels which should change state in the square and the number of pixels actually changed in the square; and
    (b) for each pixel in the square, determining whether the pixel is an edge pixel, and if the pixel is an edge pixel:
        (i) adjusting the error variable by adding the probability of change determined for the edge pixel; and
        (ii) if the error variable meets or exceeds a predetermined criteria, changing the state of the edge pixel and reducing the error variable by one.

14. The method of claim 8 further comprising altering the probability of change for select edge pixels based on the state of neighboring pixels, wherein the probability of change for edge pixels having many neighboring pixels in an opposite state is increased and the probability of change for edge pixels having few neighboring pixels in an opposite state is decreased.

15. The method of claim 14, wherein altering the probability of change for select edge pixels based on the state of neighboring pixels comprises:
    reversing the state of any edge pixel that was modified if the edge pixel only has one neighboring pixel with an opposite state; and
    for each edge pixel that has its state reversed, changing the state of a neighboring edge pixel having more than one neighboring pixel with the opposite state.

16. The method of claim 15, wherein altering the probability of change for select edge pixels based on the state of neighboring pixels comprises:
    reversing the state of any edge pixel that was modified if the edge pixel only has one neighboring pixel with an opposite state; and
    for each edge pixel that has its state reversed, changing the state of a neighboring edge pixel having more than one neighboring pixel with the opposite state.

17. A method for adjusting the tone of a binary halftone image, wherein the binary halftone image is formatted in a bit-mapped manner such that a plurality of dots in the binary halftone image represent an original contone image, the method comprising:
    (a) determining original tonal values represented by the binary halftone image;
    (b) determining desired tonal chances for the binary halftone image as a function of the original tonal values;
    (c) changing the state of a sufficient number of edge pixels in the binary halftone image to effectuate the desired tonal changes, wherein edge pixels are pixels having at least one neighboring pixel with a different state;
    wherein changing the state of a sufficient number of edge pixels in the binary halftone image to effectuate the desired tonal changes comprises:
    (a) determining a probability of change for each pixel according to a corresponding value in the desired tonal adjustment; and
    (b) changing the state of a sufficient number of edge pixels in the binary halftone image according to the corresponding probability of change for each edge pixel by;
        (i) determining a plurality of paths for scanning the binary halftone image;
        (ii) for each path, defining a variable monitoring the difference between the number of pixels which should change state and the number of pixels actually changed; and
        (iii) for each edge pixel in each path, adjusting the error variable by adding the probability of change determined for the pixel, and if the error variable meets or exceeds a predetermined criteria, changing the state of the edge pixel and reducing the error variable by one.

18. The method of claim 17 further comprising altering the probability of change for select edge pixels based on the state of neighboring pixels, wherein the probability of change for edge pixels having many neighboring pixels in an opposite state is increased and the probability of change for edge pixels having few neighboring pixels in an opposite state is decreased.

19. A method for adjusting the tone of a binary halftone image, wherein the binary halftone image is formatted in a bit-mapped manner such that a plurality of dots in the binary halftone image represent an original contone image, the method comprising:
    (a) determining original tonal values represented by the binary halftone image;
    (b) determining desired tonal changes for the binary halftone image as a function of the original tonal values;
    (c) changing the state of a sufficient number of edge pixels in the binary halftone image to effectuate the desired tonal changes, wherein edge pixels are pixels having at least one neighboring pixel with a different state; and
    (d) determining whether the number of edge pixels which have to change state in an area to effectuate the desired tonal change exceeds the number of edge pixels in the area, and if so:
        modifying the state of all the edge pixels in the area available for effectuating the tonal change; and
        determining a modified calibrated image for further processing.

20. A method for adjusting the tone of a binary halftone image, wherein the binary halftone image is formatted in a bit-mapped manner such that a plurality of dots in the binary halftone image represent an original contone image, the method comprising:
    (a) determining original tonal values represented by the binary halftone image;
    (b) determining desired tonal chances for the binary halftone image as a function of the original tonal values;
    (c) changing the state of a sufficient number of edge pixels in the binary halftone image to effectuate the desired tonal changes, wherein edge pixels are pixels having at least one neighboring pixel with a different state; and (d) determining color separation layers of the original tonal values, wherein determining desired tonal changes for the binary halftone image as a function of the original tonal values comprises determining desired tonal changes for the binary halftone image as a function of the color separation layers of the original tonal values.

21. A method for adjusting the tone of a binary halftone image, wherein the binary halftone image is formatted in a bit-mapped manner such that a plurality of dots in the binary halftone image represents an original contone image, the method comprising:

determining a tonal change for each edge pixel in the binary halftone image based upon the difference between an average tonal value calculated from the binary halftone image for a specific edge pixel and a calibrated tonal value for the specific edge pixel determined from a calibration curve for a target output device, wherein edge pixels are pixels which have at least one neighboring pixel with a different state;

determining a probability of change for each edge pixel based on the corresponding desired tonal change for each edge pixel; and modifying the binary halftone image by changing the state of edge pixels having a probability of change meeting a predetermined criteria.

22. A method for adjusting the tone of a binary halftone image, wherein the binary halftone image is formatted in a bit-mapped manner such that a plurality of dots in the binary halftone image represent an original contone image and wherein the binary halftone image is represented by a plurality of pixels, the method comprising:

(a) determining an original tonal value represented by the binary halftone image for each pixel;

(b) determining a desired tonal change for the binary halftone image for each pixel based on the corresponding original tonal value for each pixel; and (c) changing the area of at least one of said plurality of dots by changing the state of a number of edge pixels in the binary halftone image based on the desired tonal changes, wherein edge pixels are pixels having at least one neighboring pixel with a different state.

23. A method for adjusting the tone of a binary halftone image, the binary halftone image being formatted in a bit-mapped manner such that a plurality of dots in the binary halftone image represent an original contone image, each of said dots being defined by a plurality of edge pixels, wherein edge pixels are pixels having at least one neighboring pixel with a different state, said method comprising:

(a) determining an original tonal value represented by the binary halftone image at each point;

(b) determining a number of edge pixels which need to change state based on the original tonal values; and (c) changing the area of at least one of said plurality of dots by changing the state of the determined number of edge pixels in the binary halftone image.

24. The method of claim 23, wherein only edge pixels of the same state are changed for an individual dot.

25. A method for changing the tone of a binary halftone image, comprising:

(a) determining original tonal values represented by the binary halftone image by applying a first low-pass filter to the binary halftone image;

(b) determining tonal change values using the original contone values;

(c) generating a first perimeter image and a second perimeter image from the binary halftone image, the first perimeter image comprising edge pixels of the binary halftone image having a first state, and the second perimeter image comprising edge pixels of the binary halftone image having a second state, wherein edge pixels are pixels having at least one neighboring pixel with a different state;

(d) selecting a point in the binary halftone image and determining an average density of pixels to change by applying a second low-pass filter to the first perimeter image and to the second perimeter image, the second low-pass filter being substantially the same as the first low-pass filter;

(e) calculating a proportion of edge pixels to change near the selected point in the binary halftone image based on the tonal change values and average density of pixels to change;

(f) selecting the calculated proportion of edge pixels near the selected point in the binary halftone image; and (g) changing the state of the selected proportion of edge pixels near the selected point in the binary halftone image.

* * * * *